(12) United States Patent
Balon et al.

(10) Patent No.: US 11,732,729 B2
(45) Date of Patent: Aug. 22, 2023

(54) SHEET METAL TURBINE HOUSING

(71) Applicant: Garrett Transportation I Inc, Torrance, CA (US)

(72) Inventors: Petr Balon, Pozorice (CZ); Philippe Renaud, Sanchey (FR); Dusan Chadim, Brno (CZ)

(73) Assignee: GARRETT TRANSPORTATION I INC, Torrance, CA (US)

( * ) Notice: Subject to any disclaimer, the term of this patent is extended or adjusted under 35 U.S.C. 154(b) by 88 days.

(21) Appl. No.: 17/248,462

(22) Filed: Jan. 26, 2021

(65) Prior Publication Data
US 2022/0235793 A1 Jul. 28, 2022

(51) Int. Cl.
*F04D 29/42* (2006.01)
*F04D 17/00* (2006.01)
*F01D 25/24* (2006.01)

(52) U.S. Cl.
CPC ......... *F04D 29/4206* (2013.01); *F01D 25/24* (2013.01); *F04D 17/00* (2013.01); *F05D 2220/40* (2013.01); *F05D 2230/54* (2013.01)

(58) Field of Classification Search
CPC .. F04D 29/403; F04D 29/4206; F04D 29/422; F04D 17/04; F01D 25/24; F01D 25/243; F01D 9/026; F05D 2220/40; F05D 2230/54
See application file for complete search history.

(56) References Cited

U.S. PATENT DOCUMENTS

| | | | |
|---|---|---|---|
| 2,801,043 A | 7/1957 | Spotz et al. | |
| 3,965,681 A | 6/1976 | Wyczalek et al. | |
| 5,501,075 A | 3/1996 | Spies et al. | |
| 5,934,070 A | 8/1999 | Lagelstorfer | |
| 6,553,762 B2 | 4/2003 | Loffler et al. | |
| 6,682,321 B1 | 1/2004 | Mukherjee et al. | |
| 6,908,595 B1 | 6/2005 | Biel, Jr. et al. | |
| 6,951,450 B1 | 10/2005 | Figura et al. | |
| 7,074,009 B2 * | 7/2006 | Allmang | F01D 25/145 415/177 |
| 7,198,459 B2 | 4/2007 | Grussmann et al. | |

(Continued)

FOREIGN PATENT DOCUMENTS

| | | |
|---|---|---|
| DE | 29909018 U1 | 5/1999 |
| DE | 10022052 A1 | 3/2001 |

(Continued)

OTHER PUBLICATIONS

DE-102013202073-A1, Aug. 2014, Fiedler M—English Translation (Year: 2014).*

*Primary Examiner* — Brian P Wolcott
(74) *Attorney, Agent, or Firm* — Lorenz & Kopf, LLP

(57) ABSTRACT

Turbine housing assemblies and related fabrication methods are provided. A turbine housing assembly includes a bearing flange, a tongue member, a first sheet metal structure providing an inner contour of an inlet passage and joined to the tongue member, and a second sheet metal structure including an inlet portion providing an outer contour of the inlet and a volute portion providing an outer contour of a volute in fluid communication with the inlet. The volute portion is joined to the tongue member to define the volute, and the inlet portion of the second sheet metal structure is joined to the first sheet metal structure to define the inlet passage.

20 Claims, 13 Drawing Sheets

(56) References Cited

U.S. PATENT DOCUMENTS

| | | |
|---|---|---|
| 7,234,302 B2 | 6/2007 | Korner |
| 7,371,047 B2 | 5/2008 | Burmester et al. |
| 8,312,721 B2 | 11/2012 | Smatloch et al. |
| 8,382,429 B2 | 2/2013 | Grussmann et al. |
| 8,549,851 B2 | 10/2013 | Grussmann et al. |
| 8,628,296 B2 | 1/2014 | Grussmann et al. |
| 8,667,679 B2 | 3/2014 | Smatloch et al. |
| 8,726,655 B2 | 5/2014 | Smatloch et al. |
| 8,826,660 B2 | 9/2014 | Gockel et al. |
| 9,021,802 B2 | 5/2015 | Petitjean et al. |
| 9,097,120 B2 | 8/2015 | Petitjean et al. |
| 9,097,181 B2 | 8/2015 | Grussmann |
| 9,121,281 B2 * | 9/2015 | Sadamitsu ............ F01D 21/045 |
| 9,194,292 B2 | 11/2015 | Yokoyama et al. |
| 9,234,459 B2 | 1/2016 | Sadamitsu et al. |
| 9,249,714 B2 | 2/2016 | Ewers et al. |
| 9,255,485 B2 | 2/2016 | Watanabe et al. |
| 9,261,109 B2 | 2/2016 | Maeda et al. |
| 9,376,936 B2 | 6/2016 | Smatloch |
| 9,416,719 B2 | 8/2016 | Grussmann |
| 9,447,698 B2 | 9/2016 | Grussmann et al. |
| 9,581,045 B2 * | 2/2017 | Nagae ..................... F01D 25/24 |
| 9,677,453 B2 | 6/2017 | Wegener et al. |
| 9,702,266 B2 | 7/2017 | Celaya et al. |
| 9,835,165 B2 * | 12/2017 | Jinnai .................. F04D 29/403 |
| 10,436,069 B2 * | 10/2019 | Azuma ................ F01D 25/005 |
| 10,472,988 B2 * | 11/2019 | Azuma ................ F01D 25/005 |
| 10,494,955 B2 * | 12/2019 | Azuma ................. F02B 39/16 |
| 10,519,850 B2 * | 12/2019 | Yokoyama ............. F02B 39/00 |
| 10,544,703 B2 * | 1/2020 | Azuma .................. F01D 9/026 |
| 10,690,144 B2 * | 6/2020 | Nandagopal .......... F04D 29/624 |
| 10,704,420 B2 * | 7/2020 | Sato ........................ F01D 9/026 |
| 2005/0019158 A1 | 1/2005 | Claus et al. |
| 2005/0126163 A1 | 6/2005 | Bjornsson, Sr. |
| 2006/0133931 A1 | 6/2006 | Burmester et al. |
| 2007/0113550 A1 | 5/2007 | Sausee et al. |
| 2010/0098533 A1 | 4/2010 | Grussmann |
| 2011/0016859 A1 | 1/2011 | Schumnig |
| 2011/0286837 A1 | 11/2011 | Smatloch et al. |
| 2012/0288364 A1 | 11/2012 | Sadamitsu et al. |
| 2012/0304952 A1 | 12/2012 | Perrin et al. |
| 2013/0108414 A1 | 5/2013 | Maeda et al. |
| 2013/0156567 A1 | 6/2013 | Nagae et al. |
| 2014/0238336 A1 | 8/2014 | McMullen |
| 2015/0044034 A1 | 2/2015 | Jinnai et al. |
| 2015/0086347 A1 | 3/2015 | Jinnai et al. |
| 2016/0130979 A1 | 5/2016 | Grussmann |
| 2016/0201513 A1 | 7/2016 | Grussmann |
| 2018/0003306 A1 | 1/2018 | Bonanno |
| 2018/0066541 A1 | 3/2018 | Hara et al. |
| 2018/0216490 A1 | 8/2018 | Azuma et al. |
| 2018/0216492 A1 | 8/2018 | Azuma et al. |
| 2018/0328226 A1 | 11/2018 | Yokoshima et al. |

FOREIGN PATENT DOCUMENTS

| | | |
|---|---|---|
| DE | 10218436 C1 | 8/2003 |
| DE | 102009042260 A1 | 4/2011 |
| DE | 102012110707 A1 | 5/2014 |
| DE | 112011105790 B4 | 8/2014 |
| DE | 102004039477 B4 | 1/2015 |
| DE | 102009025054 B4 | 12/2015 |
| DE | 102009042260 B4 | 12/2015 |
| EP | 1500788 A1 | 1/2005 |
| EP | 1541826 A1 | 6/2005 |
| EP | 1450017 B1 | 12/2005 |
| EP | 1450017 B8 | 6/2006 |
| EP | 1676016 B1 | 4/2007 |
| EP | 1303683 B1 | 7/2008 |
| EP | 2180163 B1 | 6/2013 |
| EP | 1426557 B1 | 7/2013 |
| EP | 2719880 A2 | 4/2014 |
| EP | 2832886 A1 | 2/2015 |
| EP | 1631736 B1 | 7/2015 |
| FR | 2795769 A1 | 1/2001 |
| GB | 1199158 A | 7/1970 |
| GB | 1263932 A | 2/1972 |
| JP | 2002004871 A | 1/2002 |
| JP | 2002054447 A | 2/2002 |
| JP | 2002349276 A | 12/2002 |
| JP | 2003293779 A | 10/2003 |
| JP | 2003293780 A | 10/2003 |
| JP | 2006161573 A | 6/2006 |
| JP | 2006161579 A | 6/2006 |
| JP | 2008069664 A | 3/2008 |
| JP | 2010168969 A | 8/2010 |
| JP | 2016031027 A | 3/2016 |
| WO | 0194754 A1 | 12/2001 |
| WO | 2004109062 A1 | 12/2004 |
| WO | 2009114568 A2 | 9/2009 |
| WO | 2015185408 A1 | 12/2015 |
| WO | 2016139799 A1 | 9/2016 |
| WO | 2016152586 A1 | 9/2016 |
| WO | 2017078088 A1 | 5/2017 |

* cited by examiner

SHEET METAL TURBINE HOUSING

TECHNICAL FIELD

The subject matter described herein relates generally to flow control systems, and more particularly, to turbine housings for use in turbocharger systems.

BACKGROUND

Turbocharger systems are frequently used to improve the efficiency of internal combustion engines, for example, to achieve fuel economy targets or other environmental goals. During operation, the turbine housing experiences thermal and mechanical stress, and as a result, is often the most expensive component of a turbocharger system due to its size, complexity and material. In some situations, the added financial cost in conjunction with the size, packaging, assembly, or installation constraints may be prohibitive. Additionally, introducing turbines into the exhaust gas flow can reduce the temperature of the exhaust gas and may reduce the effectiveness of downstream emissions control devices, such as a catalytic converter. Accordingly, it is desirable to provide a turbine housing having lower thermal inertia while also achieving other performance objectives and maintaining structural integrity.

BRIEF SUMMARY

Turbine housing assemblies and related fabrication methods are provided. An exemplary turbine housing assembly includes a bearing flange, a tongue member coupled to the bearing flange, a first sheet metal structure joined to the tongue member, the first sheet metal structure providing an inner contour of an inlet passage, and a second sheet metal structure including an inlet portion providing an outer contour of the inlet passage and a volute portion providing an outer contour of a volute in fluid communication with the inlet passage. The volute portion is joined to the tongue member to define the volute and the inlet portion of the second sheet metal structure is joined to the first sheet metal structure to define the inlet passage.

In another embodiment, a turbine housing assembly includes a bearing flange, a tongue member, an inlet sheet metal structure having an end coupled to the tongue member, an inner sheet metal shell including an inlet portion and a volute portion, and an outer containment sheet metal shell surrounding at least a portion of the volute portion. The outer containment sheet metal shell is coupled to the bearing flange and spaced apart from the inner sheet metal shell, the inlet portion of the inner sheet metal shell is coupled to the inlet sheet metal structure to cooperatively define an inlet passage, and the volute portion of the inner sheet metal shell is coupled to the tongue member and the bearing flange to cooperatively define a volute in fluid communication with the inlet passage.

In another embodiment, a method of fabricating a turbine housing is provided. The method involves forming a first inlet portion from a first sheet metal structure, forming a second inlet portion and a volute portion from a second sheet metal structure, forming a first joint between an end of the first inlet portion and a tongue member joined to a bearing flange, forming a second joint between the first inlet portion and the second inlet portion to define an inlet passage, and forming a third joint between the volute portion and the tongue member, wherein the volute portion and the tongue member are cooperatively configured to define a volute in fluid communication with the inlet passage.

BRIEF DESCRIPTION OF THE DRAWINGS

Embodiments of the subject matter will hereinafter be described in conjunction with the following drawing figures, wherein like numerals denote like elements, and.

DETAILED DESCRIPTION

Figure 1:
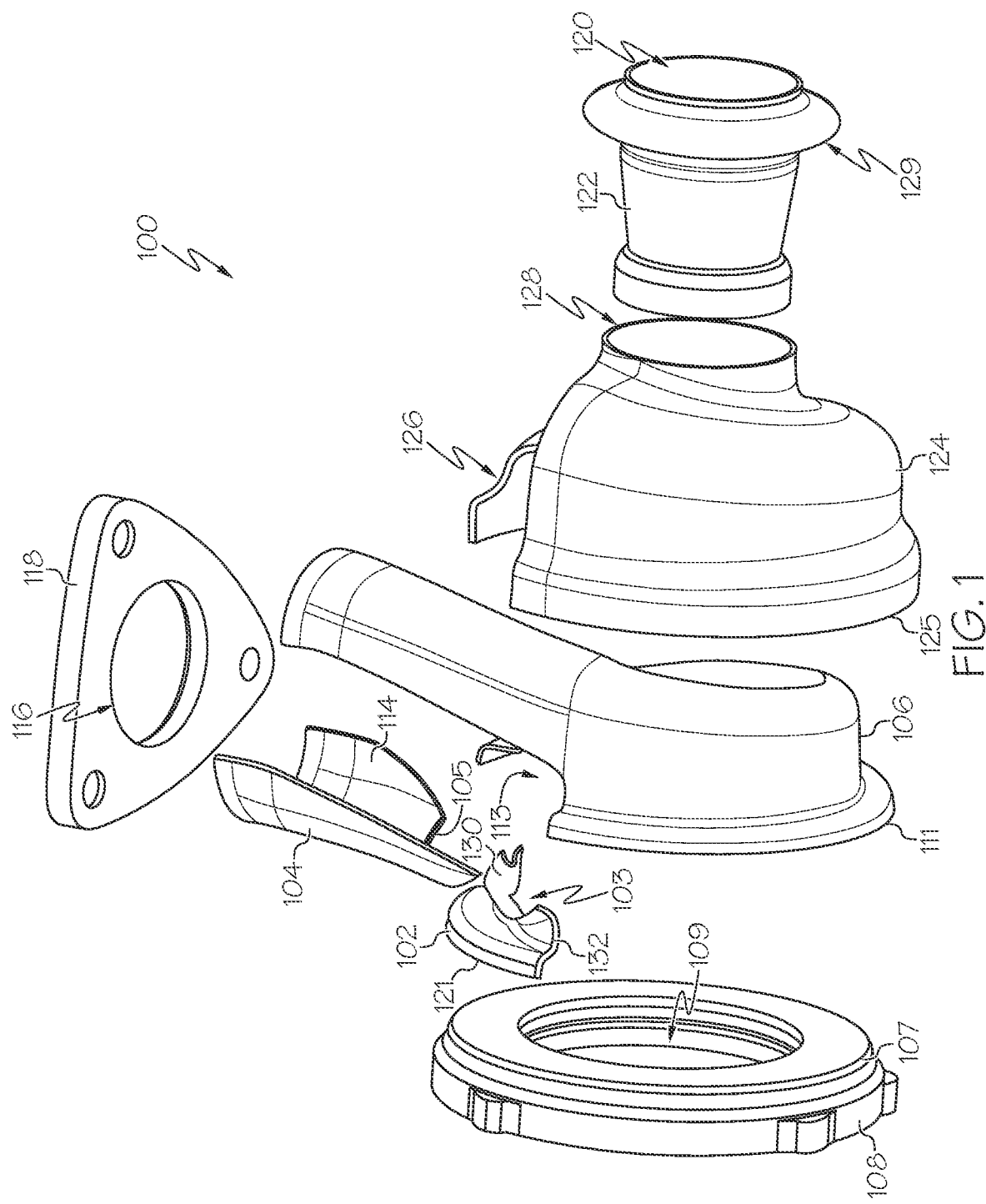
FIG. 1 is an exploded view of a turbine housing assembly in one or more exemplary embodiments.

Embodiments of the subject matter described herein relate to turbines or turbocharger systems that include a turbine stage having a multilayer sheet metal housing made up of standardizable subcomponents to provide flexibility and extensibility to accommodate different applications or installations. As described in greater detail below, the turbine housing assembly includes an inlet sheet metal piece that is joined to a tongue member and a flange having an opening for receiving a turbine wheel (alternatively referred to herein as a bearing flange or center housing flange) to define an inner contour of an inlet. An inner sheet metal shell that includes an inlet portion that defines an outer contour of the inlet and a volute portion defining an outer contour of a volute is joined to the bearing flange, the tongue member and the inlet sheet metal piece to define the inlet in fluid communication with the volute. An outer containment sheet metal shell surrounds the volute portion of the inner sheet metal shell and is joined to the bearing flange. The outer containment sheet metal shell is separated from the inner sheet metal shell by an air gap which may be occupied by a layer of thermal insulation or other thermal insulating material to minimize heat loss from the volute (which conducts relatively hotter exhaust gases) into the environment between the inner sheet metal shell and the containment sheet metal shell, thereby maintaining a relatively lower temperature for the containment shell and increasing efficiency of the turbine.

Embodiments of the turbine housing assemblies described herein may be designed for and utilized with any sort of vehicle, such as, for example, heavy-duty or performance automotive vehicles to light-duty automotive vehicles. In this regard, a turbine wheel disposed within a turbine housing assembly may be mounted or otherwise coupled to a compressor wheel (or impeller) via a common rotary shaft to function as a turbocharger. The turbine inlet may be configured to receive exhaust gas flow from the cylinders of an internal combustion engine (e.g., from the exhaust manifold), which subsequently exits or bypasses the turbine wheel to a catalytic converter or other downstream emissions arrangement (e.g., via ducting or another conduit). In practice, the catalytic converter or other emissions control device may have an efficacy that is influenced by the temperature of the exhaust gas at its inlet, and accordingly, it is desirable to minimize the thermal inertia associated with the turbine housing assembly downstream of the exhaust manifold(s) of the engine to facilitate a higher exhaust gas temperature at the inlet of the emissions arrangement.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominately in the respective nominal axial or radial direction.

Additionally, for purposes of explanation, the term "inner" may be utilized herein to refer to elements, features, or surfaces that are relatively closer to or generally face, in the axial direction, the turbine wheel or rotating assembly that the turbine housing is mounted or otherwise joined to, while the term "outer" may be utilized herein to refer to elements, features, or surfaces that are relatively farther from or generally face away from the turbine wheel or rotating assembly in the axial direction. The term "interior" may be utilized herein to refer to elements, features, or surfaces that are relatively closer to the axis of rotation associated with the turbine wheel or generally face radially inward, while the term "peripheral" may be utilized herein to refer to elements, features, or surfaces that are relatively farther from or generally face away from axis of rotation. It should also be understood that the drawings are merely illustrative and may not be drawn to scale. In addition, while the figures shown herein depict an example with certain arrangements of elements, additional intervening elements, devices, features, or components may be present in an actual embodiment.

Figure 5:
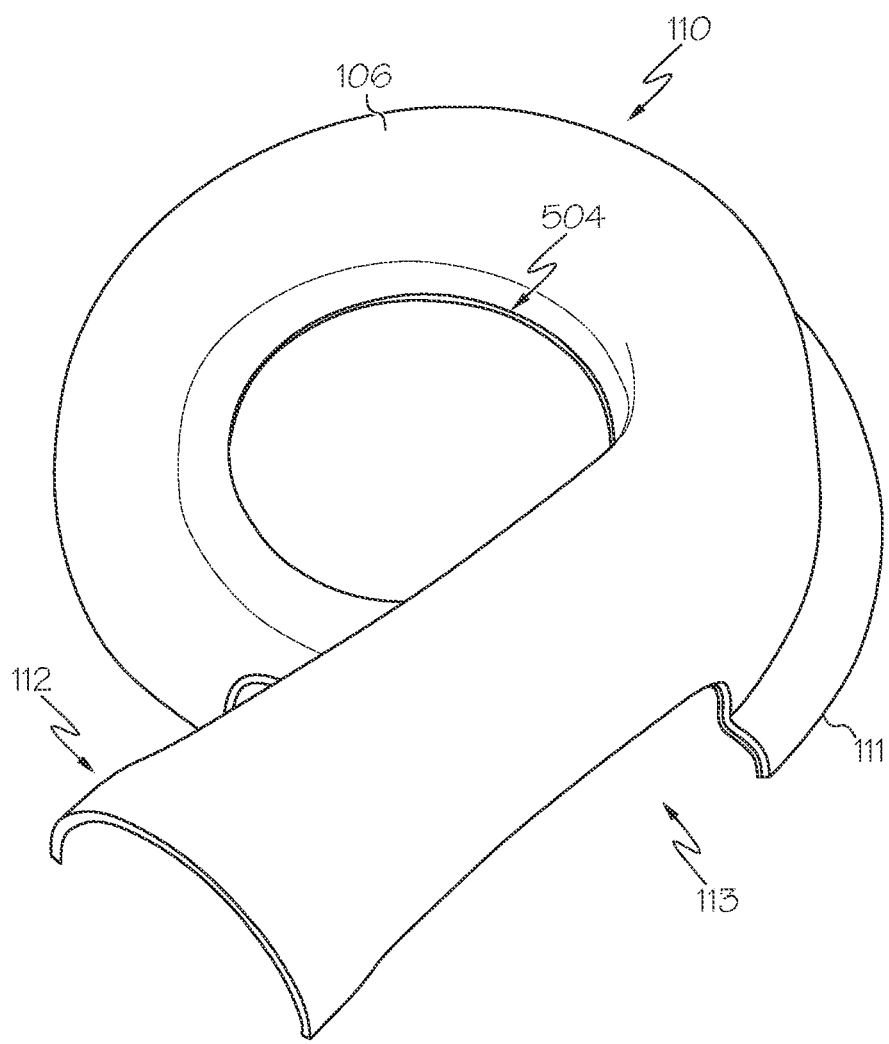
FIG. 5 is a perspective view of an inner sheet metal shell of the turbine housing assembly in FIGS. 1-2.
Figure 6:
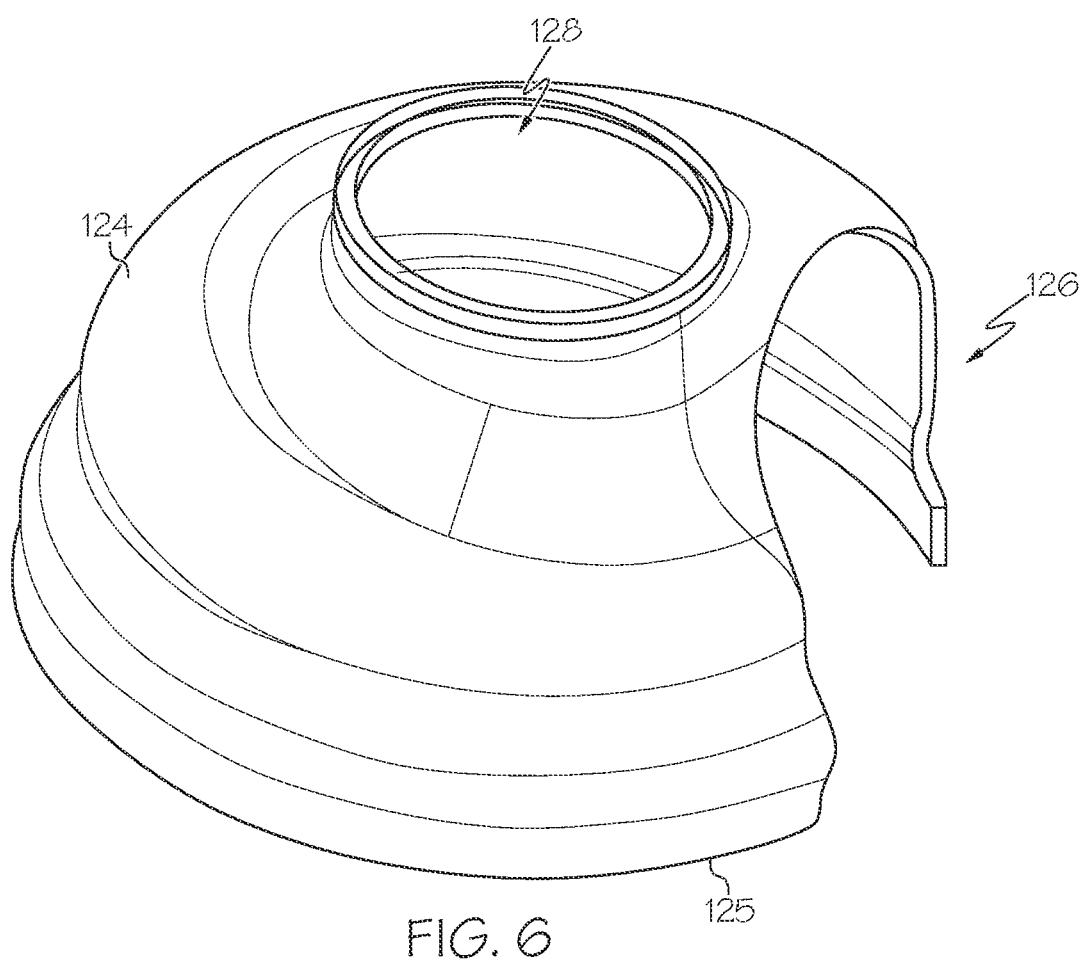
FIG. 6 is a perspective view of an outer sheet metal shell of the turbine housing assembly in FIGS. 1-2.
Figure 7:
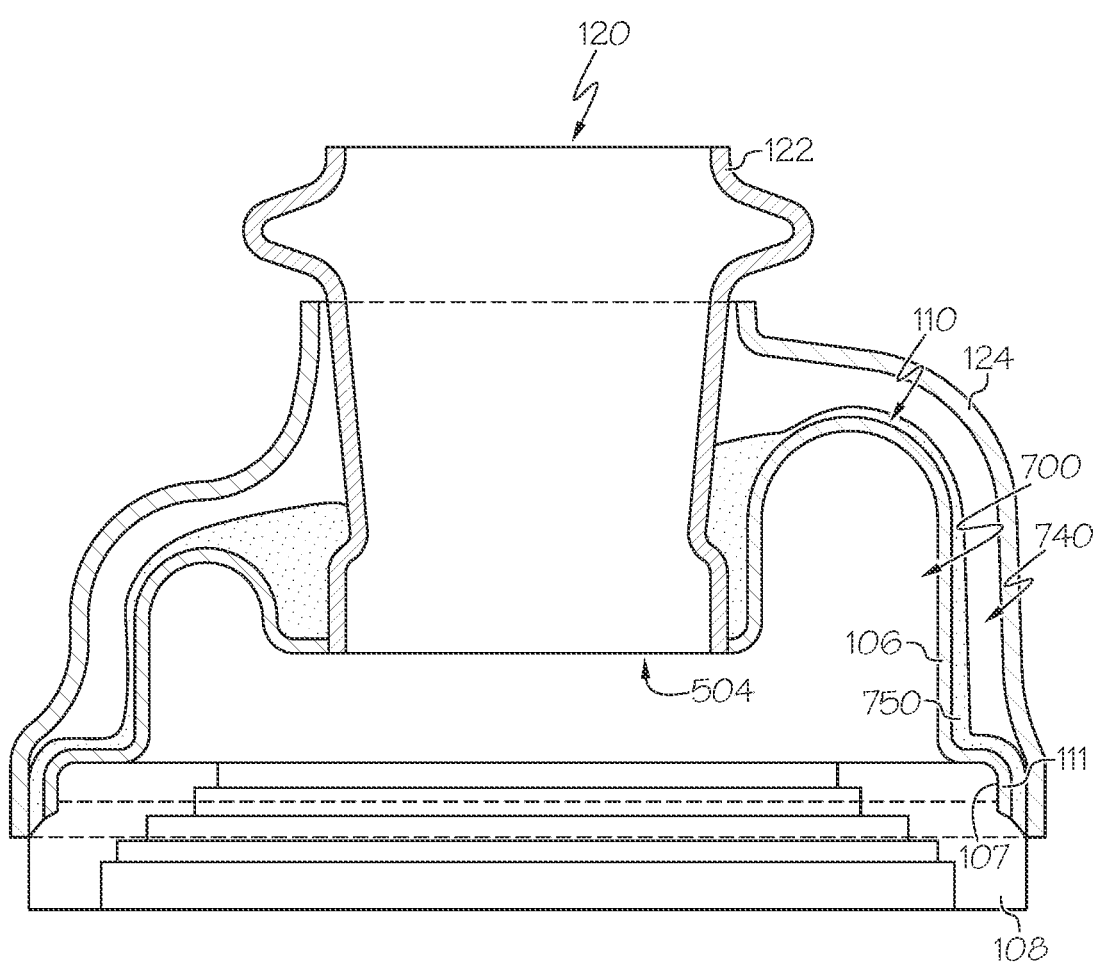
FIG. 7 is a cross-sectional view of the turbine housing assembly of FIGS. 1-2 along the line 7-7 in FIG. 2 in one or more exemplary embodiments.
Figure 8:
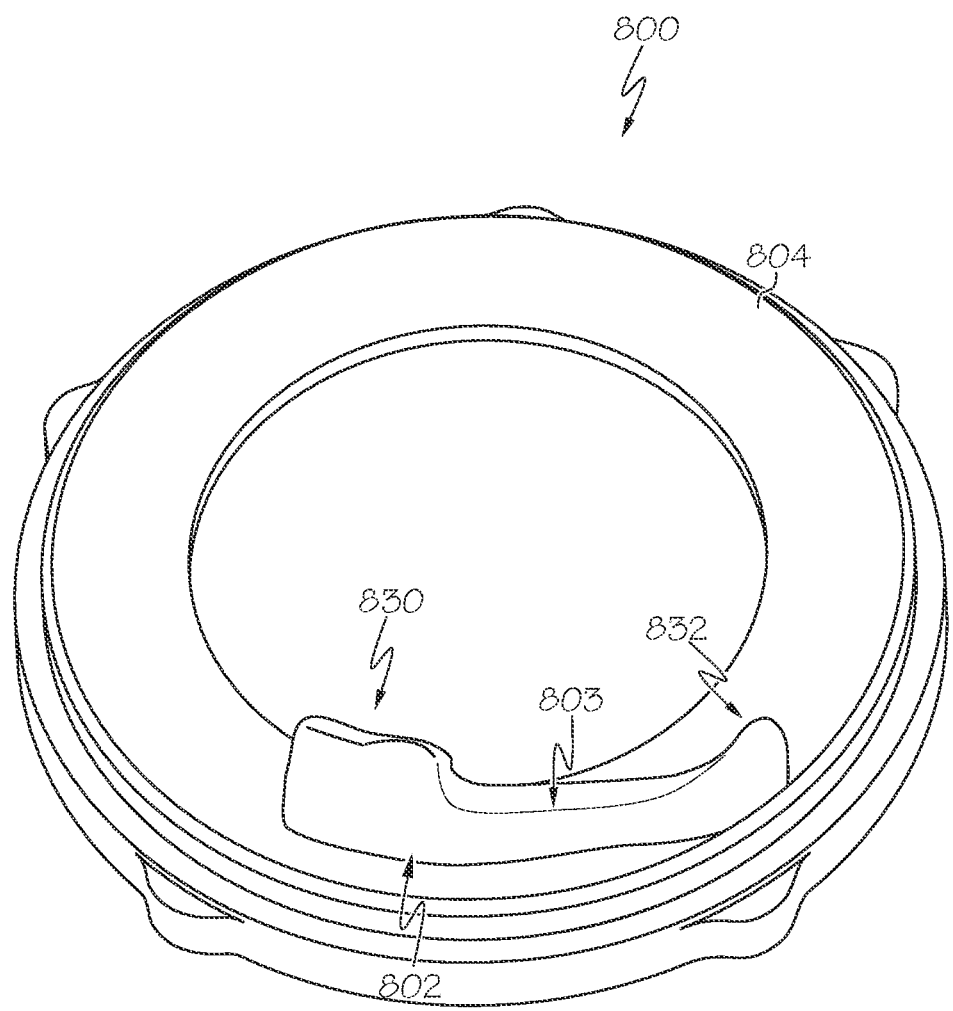
FIG. 8 is a perspective view of a flange including an integrated tongue member suitable for use in a turbine housing assembly in one or more exemplary embodiments.

FIGS. 1-7 depict an exemplary embodiment of a turbine housing assembly 100 suitable for use in a turbocharger system. The turbine housing assembly 100 includes a tongue member 102 and sheet metal structures 104, 106 that are cooperatively configured to define boundaries of a radial inlet 200 tangential to a volute 700 (FIG. 7). The tongue member 102 and sheet metal structures 104, 106 are coupled or joined to a bearing flange 108 for mounting the turbine housing assembly 100 to a rotating assembly. In this regard, the bearing flange 108 includes a substantially circular interior opening 109 configured to receive a turbine wheel to be disposed within the volute 700 defined by the sheet metal structure 106. The inner surface of a volute portion 110 of the sheet metal structure 106 that faces the turbine wheel in the axial direction is contoured to define the outer contour of the volute 700, which is a voided region providing a scroll-shaped exhaust gas passageway. For purposes of explanation, the sheet metal structure 106 may alternatively be referred to herein as the inner sheet metal shell, the volute sheet metal shell, or variants thereof. An inner surface of the inlet portion 112 of the inner sheet metal shell 106 is contoured to define the outer contour of the inlet 200 in fluid communication with the volute 700 defined by the volute portion 110, and the surface 114 of the sheet metal structure 104 that faces the inlet portion 112 of the inner sheet metal shell 106 is contoured and configured in concert with the inlet portion 112 to define the inlet 200. Stated another way, the inlet portion 112 of the inner sheet metal shell 106 cooperates with the sheet metal structure 104 to define the inlet passage 200, which is fluidly coupled to or in fluid communication with the volute 700. For purposes of explanation, the sheet metal structure 104 may alternatively be referred to herein as the inlet sheet metal structure 104.

Figure 3:
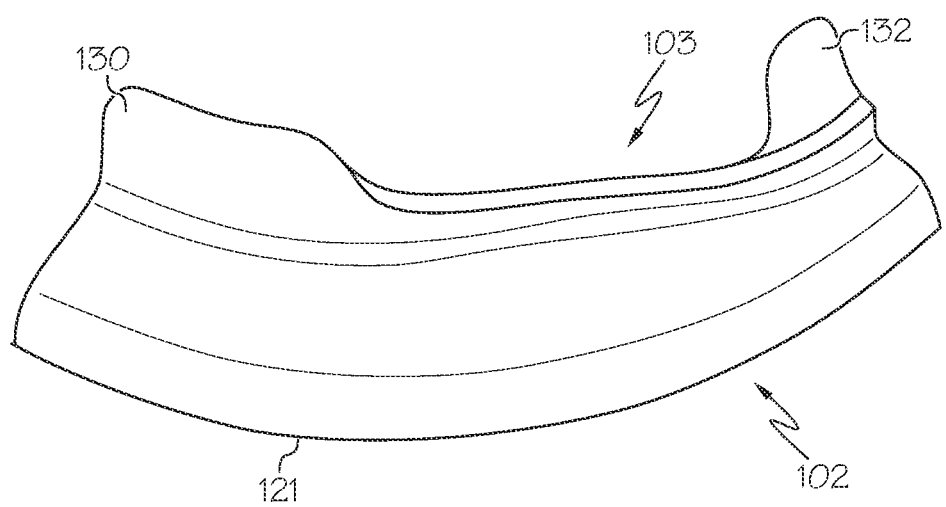
FIG. 3 is a perspective view of a tongue member of the turbine housing assembly in FIGS. 1-2.

With reference to FIG. 3, the tongue member 102 is physically distinct from the sheet metal structures 104, 106 and includes a protruding divider portion 130 that extends axially from the tongue member 102. The protruding divider portion 130 is disposed radially between the inlet sheet metal structure 104 and the volute portion 110 of the inner sheet metal shell 106 at the interface between the inlet 200 and the volute 700. The tongue member 102 directs exhaust gas received via the inlet 200 defined by the sheet metal structures 104, 106 tangentially into the volute 700 at the fluid interface between the inlet 200 and the volute 700. As described in greater detail below, in embodiments where the tongue member 102 is realized as a cast metal portion of the bearing flange 108, the cast tongue member 102 achieves better thermomechanical reliability, performance (e.g., tongue shape) and high-cycle fatigue (HCF) behavior (e.g., tongue position) relative to turbine housing designs having additional welding at or near the tongue.

Still referring to FIG. 1, the divider portion 130 may radially separate the inlet exit end 105 of the inlet sheet metal structure 104 from the volute portion 110 of the inner sheet metal shell 106. The inner surface of the volute portion 110 of the sheet metal shell 106 is contoured to define the outer contour of the scroll-shaped voided region of the volute passage 700. The volute passage 700 narrows as gas flows radially starting from the interface with the inlet passage 200 at one end portion 132 of the tongue member 102 until reaching the divider portion 130 at the opposing end of the tongue member 102, with the divider portion 130 separating the volute 700 from the inlet passage 200. The volute portion 110 of the inner sheet metal shell 106 includes a voided or cutout region 113 corresponding to the tongue member 102, with the edges of the cutout region being welded, joined, brazed or otherwise affixed to the radially outer edges of the end portions 130, 132 of the tongue member 102 to hermetically seal the volute portion 110 to the tongue member 102. In this regard, the protruding portions 130, 132 of the tongue member 102 are joined to the volute portion 110.

In exemplary embodiments, the bearing flange 108 is realized as a substantially annular unitary cast metal structure having a central opening 109 for receiving or otherwise accommodating a turbine wheel. The bearing flange 108 includes a recessed rim 107 or a similar contoured feature about its peripheral circumference on the surface that faces the sheet metal shell 106 in the axial direction in order to support coupling, joining or otherwise mounting the sheet metal shell 106 to the bearing flange 108. The recessed mounting feature 107 on the bearing flange 108 may correspond to the outer circumference of the opening of the sheet metal shell 106 facing the bearing flange 108 to mate with the sheet metal shell 106 and establish a welding seam or joint in a radial plane about the interface between the sheet metal shell 106 and the bearing flange 108. In this regard, the end of the volute portion 110 proximate the bearing flange 108 may include a corresponding rim 111 about the outer circumference of the opening in the inner sheet metal structure 106 that faces the bearing flange 108, with the rim 111 extending in the axial direction towards the bearing flange 108 to mate with the corresponding recessed feature 107 of the bearing flange 108. The end of the rim 111 of the sheet metal shell 106 proximate the bearing flange 108 may be joined circumferentially to the corresponding mounting feature 107 of the bearing flange 108 by welding, brazing, etc. to hermetically seal the sheet metal shell 106 to the flange 108 in the axial direction at the interface defined between the corresponding mounting features 107, 111.

As described in greater detail below in the context of FIGS. 7-10, in some exemplary embodiments, the tongue member 102 is integrated with, integrally formed with, monolithic or one-piece with the bearing flange 108 and realized as a cast feature of the cast bearing flange 108. That said, in other embodiments, the tongue member 102 may be realized as a separate or discrete sheet metal structure that is welded, brazed, joined or otherwise affixed to the bearing flange 108 to establish a hermetic seal between the sheet metal tongue member 102 and the cast bearing flange 108, as depicted in FIG. 1 and described in greater detail below in the context of FIGS. 11-12. Referring to FIG. 3, independent of whether the tongue member 102 is realized by casting or sheet metal, the tongue member 102 includes a voided or inlet cutout portion 103 that corresponds to or otherwise mates with an end 105 of the inlet sheet metal structure 104 proximate the volute 700 to allow the exit end 105 of the inlet sheet metal structure 104 to be welded, joined or otherwise affixed to the tongue member 102 to hermetically seal the inlet sheet metal structure 104 to the tongue member 102. In this regard, the shape and dimensions of the inlet cutout portion 103 correspond to the shape and dimensions of the inlet exit end 105 of the inlet sheet metal structure 104 to mate or otherwise fit with the inlet exit end 105 of the inlet sheet metal structure 104. Adjacent to the inlet cutout portion 103, the tongue member 102 includes a divider portion 130 that extends in an axial direction to separate or otherwise divide the inlet 200 from the volute 700. In this regard, the distance or dimension of the extension of the divider portion 130 in the axial direction is greater than the axial dimension of the inlet exit end 105 to physically separate the inlet exit end 105 of the inlet sheet metal structure 104 from the volute portion 110 of the inner sheet metal shell 106. On the other side of the inlet cutout portion 103, the tongue member 102 includes an extending portion 132 that extends in an axial direction tangentially to the volute portion 110 at the interface between the inlet sheet metal structure 104 and the volute portion 110. When the tongue member 102 is realized as a separate sheet metal structure as depicted in FIGS. 1-3, the peripheral edge of the base portion of the tongue member 102 includes a rim 121 or similar mounting feature that corresponds to the recessed feature 107 of the bearing flange 108 to mate with the bearing flange 108 similar to the rim 111 of the volute portion 110.

Figure 2:
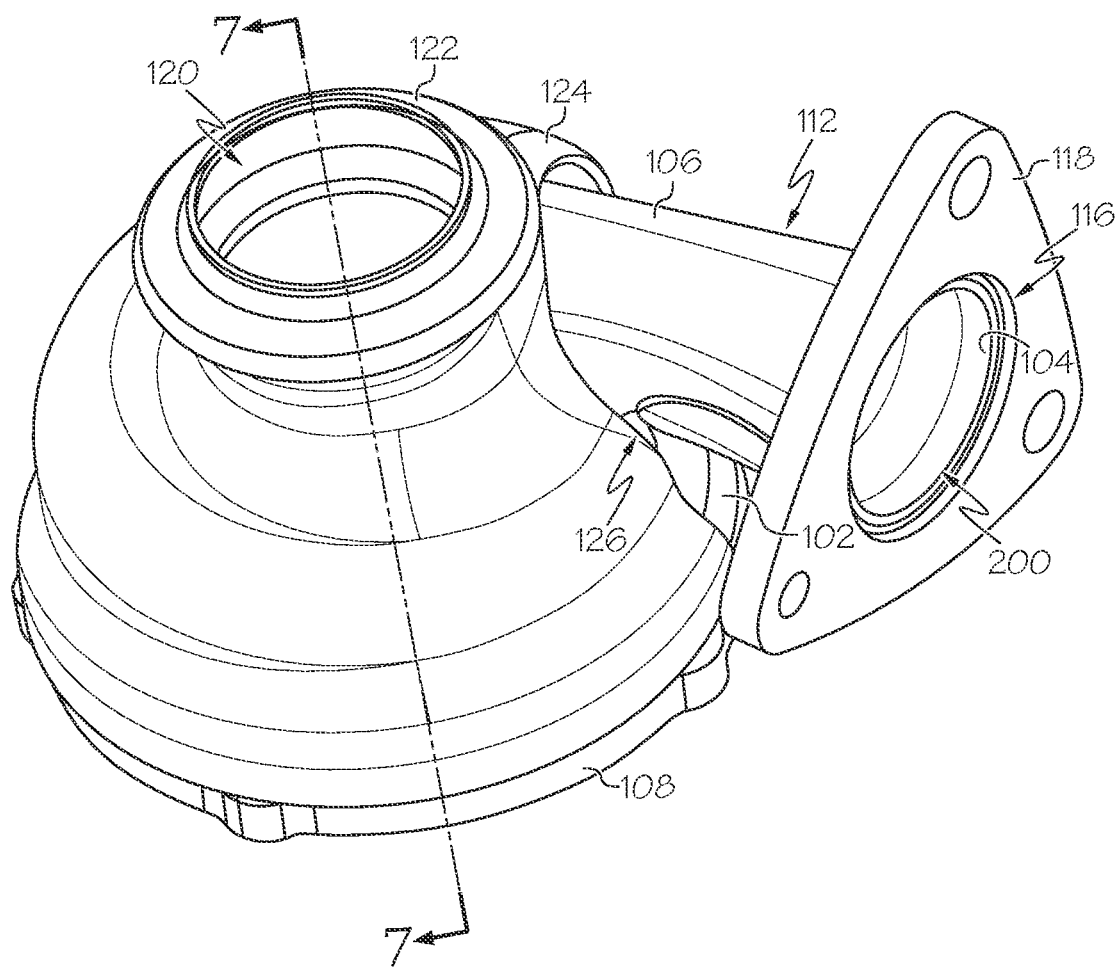
FIG. 2 is a perspective view of the turbine housing assembly of FIG. 1.
Figure 4:
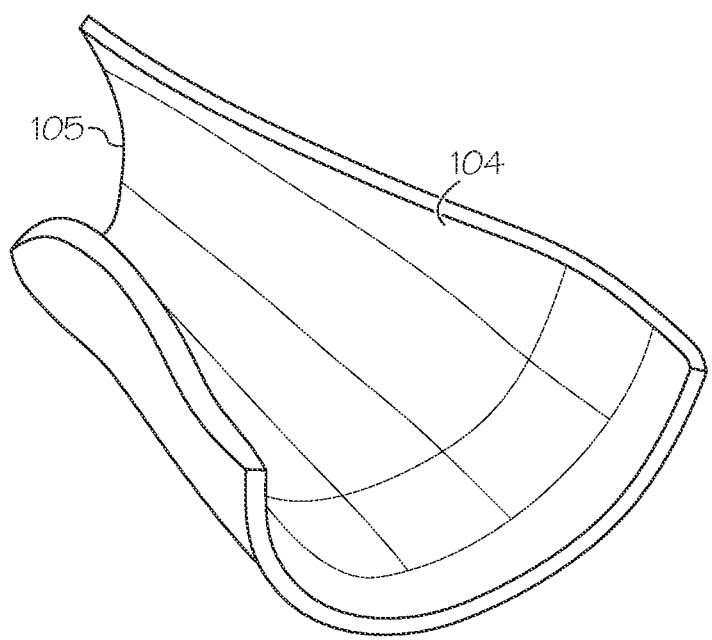
FIG. 4 is a perspective view of an inlet sheet metal structure of the turbine housing assembly in FIGS. 1-2.

Referring to FIG. 4, with continued reference to FIGS. 1-3, in exemplary embodiments, the inlet sheet metal structure 104 is contoured or otherwise pressed to provide a substantially U-shaped cross-section that cooperates with the inlet portion 112 of the sheet metal shell 106 to define the contour of the inlet gas passageway. The illustrated inlet sheet metal structure 104 is substantially frustoconical in shape such that the diameter of the exhaust gas passageway for the inlet 200 is tapered and decreases towards the interface with the volute 700 at the tongue member 102 from a larger diameter or opening of the inlet 200 opening 116 at the inlet 200 flange 118 to encourage flow tangential to the volute 700 at the interface with the volute 700. That said, it should be appreciated the shape and dimensions of the inlet sheet metal structure 104 can vary depending on the needs of a particular embodiment. The opening end of the inlet sheet metal structure 104 opposite the inlet exit end 105 of the inlet sheet metal structure 104 is cooperatively configured to define the opening of the inlet 200 in concert with the corresponding end of the inlet portion 112 of the sheet metal shell 106. In this regard, the ends of the inlet sheet metal structure 104 and the inlet portion 112 of the sheet metal shell 106 are welded, joined or otherwise affixed to an inlet flange 118 about the circumference of an inlet opening 116 in the flange 118 to hermetically seal the sheet metal structures 104, 106 to the inlet flange 118 about the opening 116. In a similar manner, the edges of the sheet metal structure 104 that face corresponding edges of the inlet portion 112 of the inner sheet metal shell 106 in the axial direction are welded, joined or otherwise affixed to the corresponding edges of the inlet portion 112 to hermetically seal the inlet 200.

Referring to FIG. 5, with continued reference to FIGS. 1-4, in exemplary embodiments, the length of the extension of the inlet portion 112 from the volute portion 110 corresponds to the length or longitudinal dimension of the inlet sheet metal structure 104, and the inlet portion 112 is similarly contoured or otherwise pressed to provide a substantially U-shaped cross-section that cooperates with the inlet sheet metal structure 104 to define boundaries of the inlet passage for tangentially directing fluid flow into a volute 700 defined by the volute portion 110. In this regard, the volute portion 110 is realized as a substantially spiral structure formed into the body of the inner sheet metal shell 106, for example, by contouring or otherwise pressing the inner sheet metal structure 106 to provide a substantially U-shaped cross-section that defines the volute passage for radially directing a tangential flow received at an interface with the inlet 200 towards a turbine wheel disposed within the volute portion. In this regard, the depth or dimension of the U-shaped cross-section progressively decreases from the interface with the inlet 200 at a first tongue portion 132 towards the opposing end of the tongue portion 130 to decrease the flow area and thereby direct flow received via the inlet 200 towards the turbine wheel, with the volute portion 110 also being configured to provide clearance for the turbine wheel to rotate and extract energy from the exhaust gas fluid flow within the volute passage. The peripheral radial edges of the volute portion 110 include or are realized as a rim, lip, or similar feature 111 that provide a surface for joining the volute portion 110 to a corresponding feature 107 of the bearing flange 108 and provide a substantially circumferential joint aligned in a substantially radial plane, as discussed previously.

Referring to FIG. 6, with continued reference to FIGS. 1-5, an outer containment sheet metal structure 124 (alternatively referred to herein as the outer containment shell) includes a substantially circular opening that is circumferentially joined to the bearing flange 108 to substantially enclose or surround the volute portion 110 of the inner sheet metal shell 106 in the axial direction. In this regard, a diameter of an opening defined through the outer containment shell 124 from the first shell end 125 to the opposite, second shell end varies along the axis of the assembly. In one example, the diameter of the opening at the first shell end 125 of the containment shell 124 proximate the bearing flange 108 is different and greater than the circumference of the volute portion 110 to substantially circumscribe the volute portion 110 of the inner sheet metal shell 106, and thereby, substantially enclose or surround the volute portion 110 of the inner sheet metal shell 106 in the radial as well as axial direction. In exemplary embodiments, the bearing end 125 of the containment shell 124 extends towards the bearing flange 108 in the axial direction by a greater distance than the rim 111 of the inner sheet metal shell 106 to radially overlap the rim 111 of the inner sheet metal shell 106. In the illustrated embodiment, the diameter of the opening at the first shell end 125 of the containment shell 124 is different and greater than an outer circumference about the mounting feature 107 to receive at least a portion of the bearing flange 108 within the opening. The first shell end 125 is welded, joined or otherwise affixed to a peripheral surface of the bearing flange 108 to couple the outer containment shell 124 to the bearing flange 108 such that the outer containment shell 124 substantially surrounds the volute portion 110. In this regard, double welding of the volute portion 110 to the containment shell 124 is avoided by joining the containment shell 124 to the bearing flange 108 via a separate welding procedure.

In exemplary embodiments, the outer containment sheet metal shell 124 is realized as a unitary sheet metal structure that is contoured or otherwise pressed to correspond to the volute portion 110 of the inner sheet metal shell 106. In exemplary embodiments, the inner or interior dimensions of the outer containment shell 124 are greater than the dimensions of the volute portion 110 to provide a space or air gap between the outer containment shell 124 and the inner sheet metal shell 124, which helps provide physical and thermal isolation between the volute portion 110 and the outer containment shell 124. The outer containment shell 124 also includes an inlet cutout region 126 that extends in the axial direction from the bearing end 125 by a dimension that is greater than the axial dimension of the inlet portion 112. IN this regard, the inlet cutout region 126 corresponds to the inlet portion 112 of the inner sheet metal shell 106 and allows the inlet portion 112 to extend from the interface of the volute portion 110 within the interior of the containment shell 124 to beyond the exterior of the containment shell 124 such that the inlet region 112 is not positioned within or is external to the outer containment shell 124. The containment shell 124 also includes an outlet opening 128 opposite the bearing end 125 to define the axial outlet of the turbine assembly 100. In exemplary embodiments, the outlet opening 128 in the containment shell 124 is substantially circular and coaxially aligned with the interior opening 504 (FIG. 5) in the inner sheet metal shell 106.

Referring to FIG. 7, and with continued reference to FIGS. 1-6, a substantially cylindrical outlet pipe 122 is disposed within the outlet opening 128. The outlet pipe 122 extends in an axial direction from the interior opening 504 in the volute portion 110 of the inner sheet metal shell 106 to an exterior of the turbine assembly 100 for coupling the turbine assembly 100 to a fluid conduit for carrying exhaust gas axially exiting the turbine wheel (e.g., to a downstream emissions device such as a catalytic converter). In exemplary embodiments, the outlet pipe 122 is realized as a unitary sheet metal structure that is inserted into the outlet opening 128 and welded, joined or otherwise affixed about the interior opening 504 in the inner sheet metal shell 106 to hermetically seal the axial outlet pipe 122 to the volute portion 110 such that all gas axially exits the turbine wheel via the outlet pipe 122. For example, the outer circumference of the end of the outlet pipe 122 proximate to the turbine wheel may be substantially the same diameter as or otherwise correspond to the circumference of the opening 504 to support welding the outlet pipe 122 to the volute portion 110 circumferentially about the opening 504. In the illustrated embodiments, the outlet pipe 122 is formed to include an intermediary collar portion 129 having a circumference or diameter greater than the circumference in the outlet opening 128 to prevent over- or under-insertion of the outlet pipe 122 into outlet opening 128 and ensure alignment of the bearing end of the outlet pipe 122 with the interior opening 504 in a radial plane. The outlet pipe 122 is also welded, joined or otherwise affixed to the containment shell 124 circumferentially about the outlet opening 128. The outlet pipe 122 functions to control the exhaust gas flow exiting the turbine assembly 100, with the collar portion 129 facilitating a V-band clamp or similar connection to ducting or another fluid conduit between the exit end of the outlet pipe 122 and an exhaust system. Welding or joining the outlet pipe 122 about both the interior outlet opening 504 of the volute portion 110 and the corresponding outlet opening 128 of the containment shell 124 supports the mechanical integrity of the turbine assembly 100 and maintains sealing of the volute 700.

Referring to FIG. 7, in one or more exemplary embodiments, an insulating material 750 is provided within an air gap 740 defined by the space between the outer containment shell 124 and the inner sheet metal shell 106. For example, a layer of a thermally-insulating fabric material may be conformably installed on or overlying the volute portion 110 of the inner sheet metal shell 106 from the interface with the bearing flange 108 until reaching the axial outlet opening 504. In such an embodiment, the thermally-insulating material 750 surrounds or otherwise encompasses the volute portion 110 of the inner sheet metal shell 106 to minimize heat loss from the volute 700 within the air gap 740 between the volute portion 110 and the containment shell 124, which increases efficiency of the turbine while reducing the temperature of the containment shell 124. In alternative embodiments, thermally-insulating material may be provided on an interior surface of the containment shell 124, in lieu of or in addition to providing the thermally-insulating material 750 on the surface of the volute portion 110. It should be noted that the subject matter described herein is not limited to a thermally-insulating fabric material, and any suitable insulating material or layer or combination thereof may be utilized within the gap between shells 106, 124 to achieve improved thermal isolation between the shells 106, 124.

Referring again to FIGS. 1-2, depending on the particular embodiment, the inlet flange 118 may include bores or other features configured to support mounting or otherwise coupling the inlet flange 118 to the exhaust manifold of an internal combustion engine or other conduit or ducting to receive exhaust gas from the engine. Likewise, depending on the embodiment, the bearing flange 108 may include bores or other features configured to support mounting or otherwise coupling the bearing flange 108 to a rotating assembly that includes a turbine wheel, a rotary shaft, and/or the like. In this regard, when the rotating assembly is mounted to the bearing flange 108, at least a portion of the blades of the turbine wheel are disposed within the volute 700 defined by the sheet metal shell 106, with the interior opening 504 in the inner sheet metal shell 106 being substantially circular and coaxially aligned with the rotational axis of the turbine wheel to receive or otherwise accommodate a nose of the turbine wheel and define the axial outlet 120 for the turbine.

Figure 9:
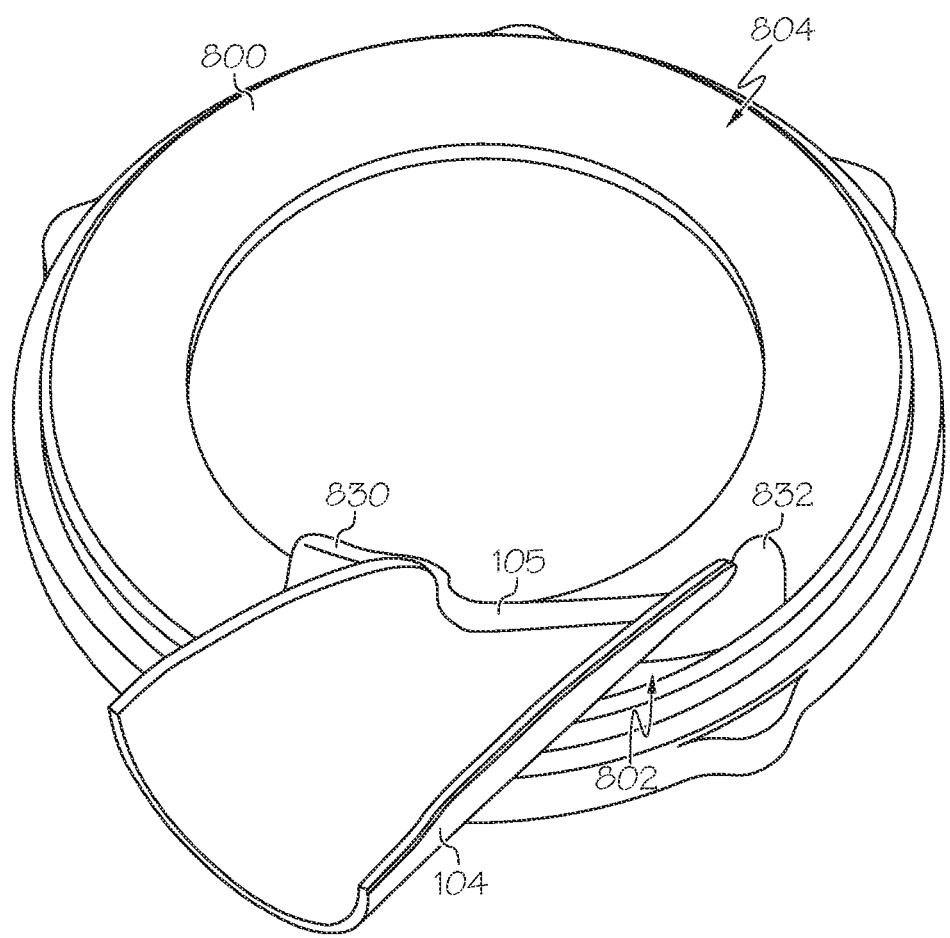
FIG. 9 is a perspective view of the flange of FIG. 8 assembled with the inlet sheet metal structure of FIG. 4 in one or more exemplary embodiments.

Referring now to FIGS. 8-11, fabrication of the turbine assembly 100 will now be described in the context of embodiments where the bearing flange 108 and the tongue member 102 are integral and realized as a unitary cast metal structure 800. In this regard, the cast metal structure 800 includes a cast tongue portion 802 corresponding to the tongue member 102 that is integral with an annular body portion 804 corresponding to the bearing flange 108. In a similar manner as described above, the cast tongue member 802 protrudes from the bearing flange body portion 804 in an axial direction and includes a raised divider portion 830 (e.g., divider portion 130) that extends axially from the base of the tongue member 802 to separate or otherwise divide the inlet passage from the volute. The opposing end of the cast tongue member 802 also includes a raised portion 832 (e.g., portion 132) that is oriented tangential to the volute. The cutout portion 803 of the tongue member 802 extends from the bearing flange body portion 804 between the raised portions 830, 832 is configured to receive and support the inlet exit end 105 of the inlet sheet metal structure 104, as depicted in FIG. 9. In this regard, the cutout portion 803 elevates the inlet exit end 105 of the inlet sheet metal structure 104 such that the inlet sheet metal structure 104 is spaced apart from and does not contact the bearing flange body portion 804.

Figure 10:
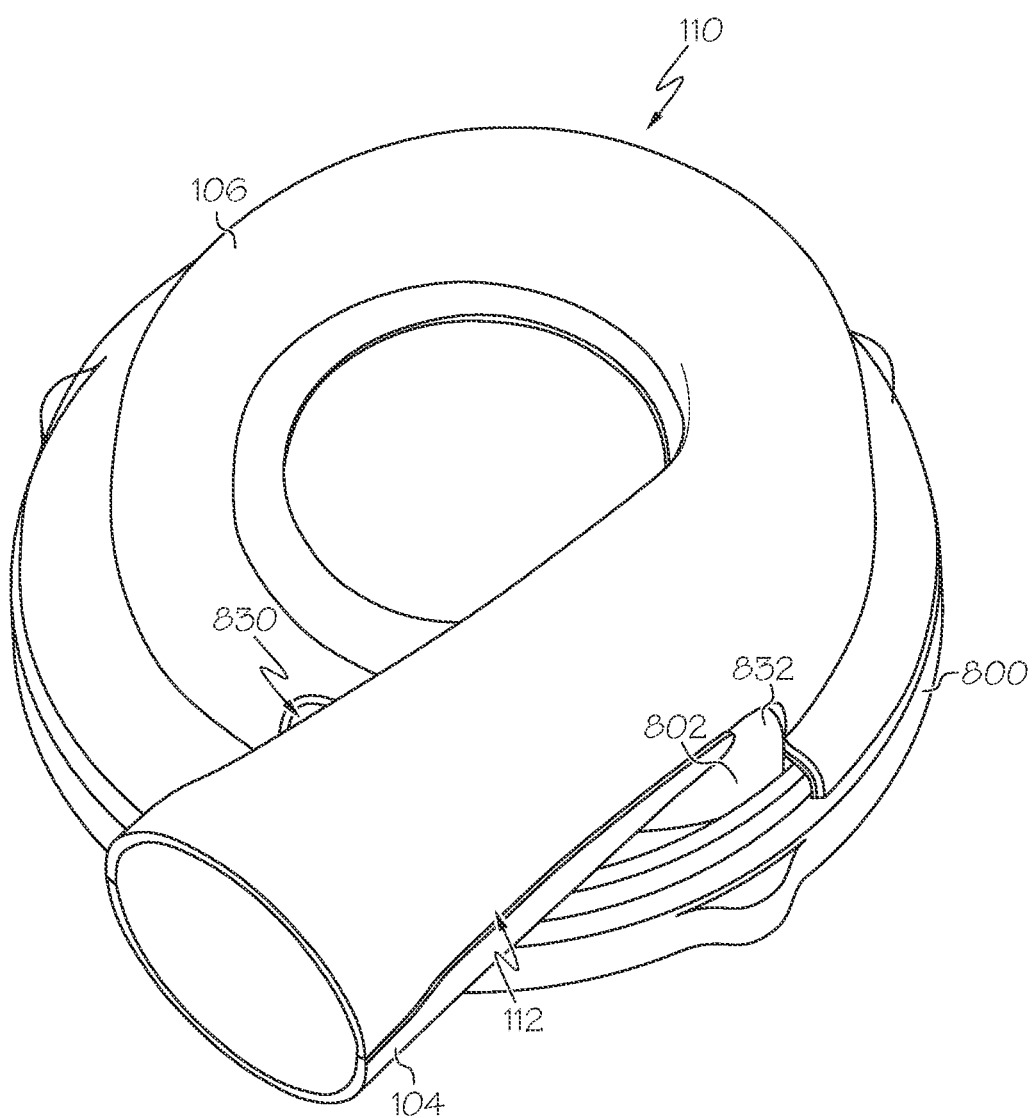
FIG. 10 is a perspective view of the inner sheet metal shell of FIG. 5 assembled with the flange and the inlet sheet metal structure after assembling the flange with the inlet sheet metal structure as depicted in FIG. 9 in one or more exemplary embodiments.

Referring to FIG. 9, the inlet exit end 105 of the inlet sheet metal structure 104 is initially welded, joined or otherwise affixed to the tongue portion 802 of the cast metal structure 800 about the interface to the volute defined by the edges of the cutout portion 803 that mate with or are otherwise configured to receive the inlet exit end 105. Stated another way, the inlet exit end 105 of the inlet sheet metal structure 104 is coupled to or received within the cut-out portion of the tongue portion 802, and the sides of the end 105 are coupled, joined or fixed to the sides of the recess. Referring to FIG. 10, after welding the inlet exit end 105 of the inlet sheet metal structure 104 to the cutout portion 803 of the cast tongue member 802, the inner sheet metal shell 106 is positioned over the assembled structures 104, 800 and then welded, joined or otherwise affixed to the cast bearing flange portion 804 about the periphery of the bearing flange portion 804 (e.g., by welding the rim 111 of the volute portion 110 of the inner sheet metal shell 106 to a corresponding feature 107 of the bearing flange 804), with the edges of the cutout region 113 of the volute portion 110 being concurrently welded or joined to the raised tongue portions 830, 832 to hermetically seal the volute between the inner sheet metal shell 106 and the bearing flange 800. In this regard, the tongue member 802 is disposed within the cutout region 113 of the volute portion 110, with the raised portions 830, 832 of the tongue member 802 radially separating the volute portion 110 from contacting the inlet exit end 105 of the inlet sheet metal structure 104. The axially outward facing edges of the inlet sheet metal structure 104 and the inner facing edges of the inlet portion 112 of the inner sheet metal shell 106 are also welded, joined or otherwise affixed together to hermetically seal the inlet 200. After assembling the sheet metal structures 104, 106 with the cast metal structure 800, a thermally-insulating material may be provided on the outer surface of the volute portion 110 or the inner surface of the containment shell 124 before positioning the containment shell 124 over the volute portion 110 and inserting the outlet pipe 122 within the axial outlet openings 128, 304.

Figure 11:
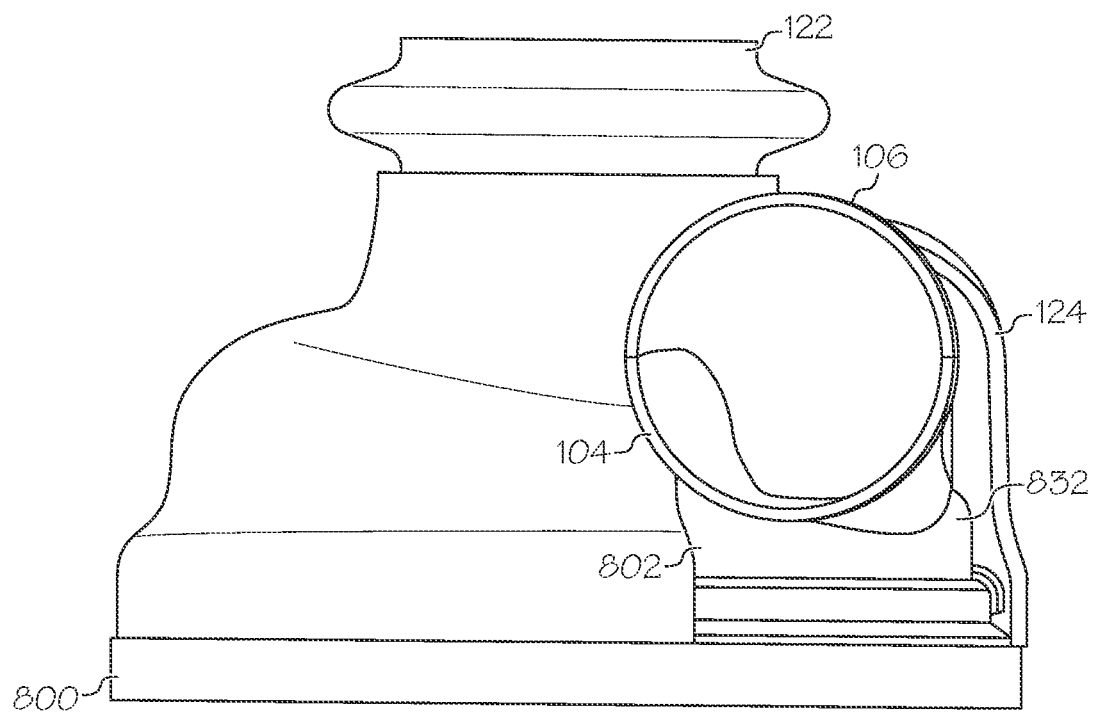
FIG. 11 is a plan view of the outer sheet metal shell of FIG. 6 assembled with the flange after assembling the inner sheet metal shell with the flange and the inlet sheet metal structure as depicted in FIG. 10 in one or more exemplary embodiments.

After assembling the inner sheet metal shell 106 within the containment shell 124 such that the gap is defined between sheet metal shells 106, 124, and the outer containment shell 124 is welded, joined or otherwise affixed to the bearing flange portion 804, resulting in the turbine housing assembly depicted in FIG. 11. Thereafter, the outlet pipe 122 is disposed within the axial outlet openings 128, 504 of the sheet metal shells 106, 124 and welded, joined or otherwise affixed about the respective axial outlet openings 128, 304 of the sheet metal shells 106, 124. Thereafter, the inlet flange 118 is welded, joined or otherwise affixed to the inlet sheet metal structure 104 and the inlet portion 112 of the inner sheet metal shell 106 about the inlet opening 116 to complete fabrication of the turbine housing assembly 100. The turbine housing assembly 100 may then be installed or otherwise mounted to a rotating assembly and the appropriate ducting or conduits for fluid flow to/from the turbine housing assembly 100, the details or which are not germane to disclosure.

Figure 12:
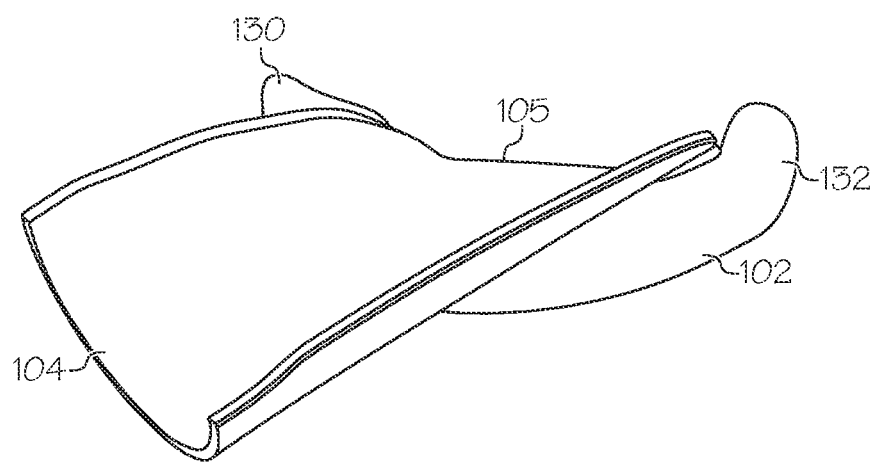
FIG. 12 is a perspective view of the tongue member of FIG. 3 assembled with the inlet sheet metal structure of FIG. 4 in one or more exemplary embodiments.
Figure 13:
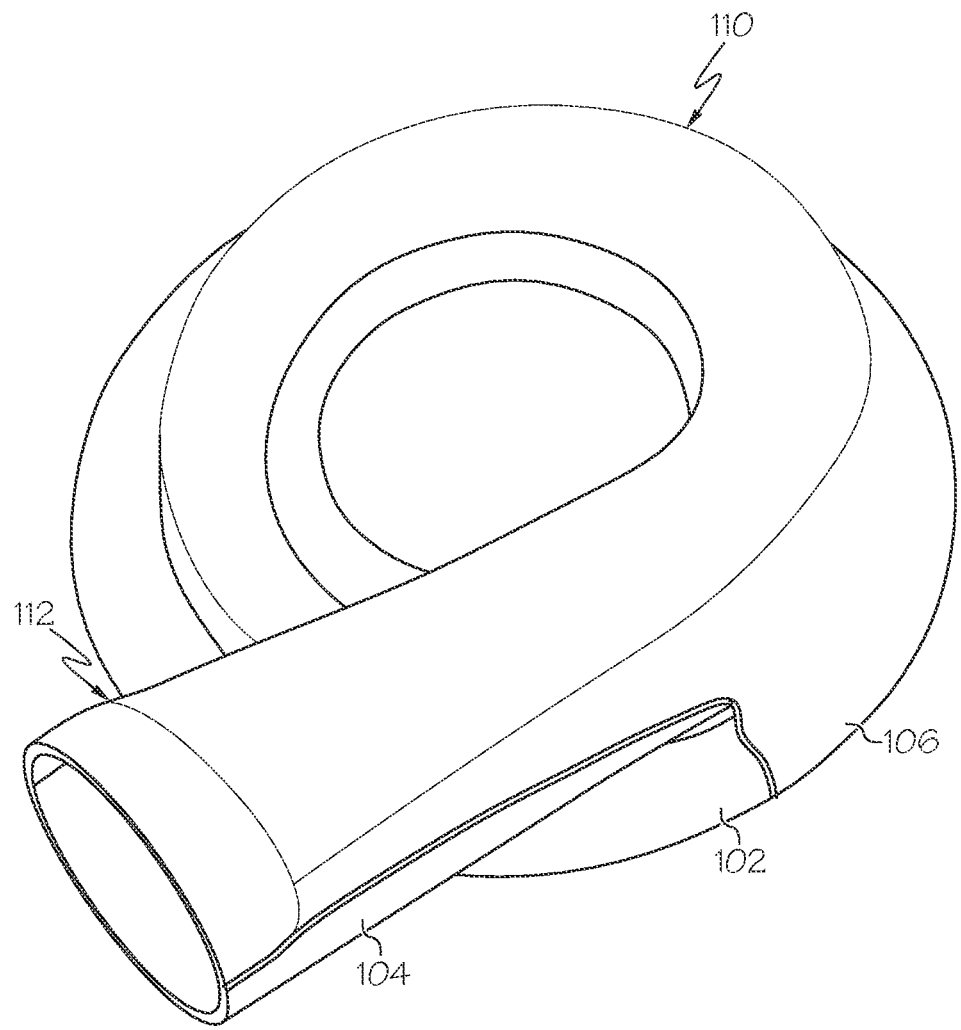
FIG. 13 is a perspective view of the inner sheet metal shell of FIG. 5 assembled with the tongue member and the inlet sheet metal structure after assembling the tongue member with the inlet sheet metal structure as depicted in FIG. 12 in one or more exemplary embodiments.

Referring now to FIGS. 12-13, fabrication of the turbine housing assembly 100 will now be described in the context of embodiments where the tongue member 102 is realized as a separate sheet metal structure as depicted in FIG. 1. In a similar manner as described above, the inlet exit end 105 of the inlet sheet metal structure 104 is initially welded, joined or otherwise affixed to the tongue member 102 about the interface to the volute defined by the edge of the cutout portion 103, as shown in FIG. 12. Thereafter, the inner sheet metal shell 106 is positioned over the assembled structures 102, 104 and then welded, joined or otherwise affixed to the raised tongue portions 130, 132 and the facing edges of the inlet sheet metal structure 104 as shown in FIG. 13, in a similar manner as described above. After assembling the sheet metal structures 102, 104, 106 together, the periphery of the volute portion 110 of the inner sheet metal shell 106 and the tongue member 102 are welded, joined or otherwise affixed to the bearing flange 108, for example, by welding the rim 111 of the volute portion 110 of the inner sheet metal shell 106 and the rim 121 of the tongue member 102 to the corresponding mounting feature 107 of the bearing flange 108. After joining the tongue member 102 and the volute portion 110 to the bearing flange 108, fabrication of the turbine housing assembly 100 may be completed in a similar manner as described above (e.g., applying a thermal insulation layer to the volute portion 110 or the containment shell 124, positioning the containment shell 124 over the volute portion 110 to define the gap and welding the containment shell 124 to the bearing flange 108, assembling the outlet pipe 122 within the sheet metal shells 106, 124, and welding the outlet pipe 122 about the corresponding openings 128, 304 in the sheet metal shells 106, 124, etc.).

To briefly summarize, the subject matter described herein provides a sheet metal turbine housing assembly capable of being manufactured using standardized turbine housing subcomponents to provide improved flexibility while also reducing costs compared to cast turbine housings, which are often the most expensive component of a turbocharger due to their size, complexity and material requirements. Cast turbine housings may also require specialized casting hardware for variations in the size, shape, and/or packaging constraints for the turbine housing to accommodate different applications or installations, while also requiring greater minimum wall thicknesses that increase costs while also increasing the mass and thermal inertia of the turbine housing. In contrast, the sheet metal structures described herein may be designed or otherwise configured to support multiple different configurations or applications.

For example, referring to FIGS. 1-2 and 6, the inlet cutout opening 126 in the outer containment shell 124 may be configured to provide clearance with respect to the inlet 200 that allows the orientation of the outer containment shell 124 to be rotatably adjusted with respect to the bearing flange 108 and the volute portion 110 according to final assembly requirements for installing the turbine housing assembly 100 in a vehicle to provide flexibility across different applications or installations. Additionally, the thickness of the outer containment shell 124 may be minimized by the sheet metal forming process to reduce weight and material costs and lower thermal inertia while maintaining containment capability. In some embodiments, the thermal insulation layer 750 is provided on the inner surface of the containment shell 124 (e.g., from the bottom inner edge to the upper inner edge to cover the entire interior surface) to minimize heat loss and reduce the temperature of the outer surface of the containment shell 124 to increase efficiency by reducing thermal losses (and improving the efficiency of a downstream catalytic converter or other emission controls by maintaining available energy and higher temperature for the exhaust gas flow). The design of the containment shell 124 can be standardized for compatibility with standardized designs of the other sheet metal structures 104, 106 via a standardized connection component (e.g., outlet pipe 122), which allows the containment shell 124 to be utilized across a wide range of turbocharger applications that share a common or standardized volute design.

Referring to FIGS. 1-2 and 5, the volute portion 110 of the inner sheet metal shell 106 may be designed and manufactured as a standardized component capable of use across a range of turbocharger applications sharing the same aerodynamic volute definition (with a corresponding cost reduction attendant to component standardization). The inlet portion 112 of the inner sheet metal shell 106 and the inlet sheet metal structure 104 may be designed and manufactured to accommodate different application-specific packaging requirements and varied across different instances of the volute portion 110. In this regard, the shape, size, and other physical characteristics of the volute portion 110 and the tongue member 102 may be standardized and maintained substantially constant across different applications, while the dimensions of the inlet sheet metal structure 104 and the inlet portion 112 vary to suit the needs of a particular application or installation. For example, the tongue member 102, the volute portion 110, the outer containment shell 124 and/or the outlet pipe 122 may be designed for universal use, while the shape and/or dimensions of the inlet sheet metal structure 104 and the inlet portion 112 may be varied depending on the application. In this manner, the sheet metal turbine housing assembly provides a flexible entrance adjustment capable of accommodating different installations. The thicknesses of the inner sheet metal shell 106 and the inlet sheet metal structure 104 may similarly be minimized by the sheet metal forming process to achieve low thermal inertia, with the thermal insulation layer 750 within the gap between the volute portion 110 and the outer containment shell 124 minimizing thermal losses.

For the sake of brevity, conventional techniques related to turbines, compressors, turbochargers, wastegates, bypass valves, ducting, catalytic converters, emissions controls, and other functional aspects of the systems (and the individual operating components of the systems) may not be described in detail herein. Furthermore, the various figures contained herein are intended to represent exemplary functional relationships and/or physical couplings between the various elements. It should be noted that many alternative or additional functional relationships or physical connections may be present in an embodiment of the subject matter.

The foregoing description may refer to elements or components or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting. For example, the terms "first," "second," and other such numerical terms referring to structures do not imply a sequence or order unless clearly indicated by the context. Similarly, terms such as "upper", "lower", "top", and "bottom" refer to directions in the drawings to which reference is made.

It should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any theory presented in the preceding background, brief summary, or the detailed description.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A turbine housing assembly comprising:
a bearing flange;
a tongue member directly coupled to the bearing flange, wherein a hermetic seal is established between the bearing flange and the tongue member;
a first sheet metal structure joined to the tongue member, the first sheet metal structure providing an inner contour of an inlet passage; and
a second sheet metal structure including an inlet portion providing an outer contour of the inlet passage and a volute portion providing an outer contour of a volute in fluid communication with the inlet passage, wherein:
the volute portion is joined to the tongue member to define the volute; and
the inlet portion of the second sheet metal structure is joined to the first sheet metal structure to define the inlet passage.

2. The turbine housing assembly of claim 1, wherein the tongue member is integrally formed with the bearing flange.

3. The turbine housing assembly of claim 1, further comprising a cast metal structure, wherein:
the bearing flange comprises an annular portion of the cast metal structure; and
the tongue member comprises a protruding portion of the cast metal structure that extends in an axial direction towards the first sheet metal structure.

4. The turbine housing assembly of claim 1, wherein the tongue member comprises a discrete sheet metal structure coupled to the bearing flange.

5. The turbine housing assembly of claim 1, wherein the first sheet metal structure includes a cutout region corresponding to the tongue member.

6. The turbine housing assembly of claim 1, wherein the second sheet metal structure includes a cutout region corresponding to the tongue member.

7. The turbine housing assembly of claim 6, wherein:
the tongue member is disposed within the cutout region and radially separates the volute portion of the second sheet metal structure from an end of the first sheet metal structure; and
the end of the first sheet metal structure is joined to the tongue member.

8. The turbine housing assembly of claim 1, wherein the tongue member includes a cutout region corresponding to an end of the first sheet metal structure and a divider portion adjacent to the cutout region and disposed between the end of the first sheet metal structure and the volute portion of the second sheet metal structure.

9. The turbine housing assembly of claim 1, further comprising a third sheet metal structure encompassing at least a portion of the volute portion of the second sheet metal structure, wherein:
the third sheet metal structure includes a cutout region corresponding to the inlet portion; and
the third sheet metal structure and the second sheet metal structure are spaced apart by an air gap.

10. The turbine housing assembly of claim 9, further comprising a layer of insulating material disposed on the second sheet metal structure within the air gap between the second sheet metal structure and the third sheet metal structure.

11. The turbine housing assembly of claim 9, further comprising an outlet pipe, wherein:
the second sheet metal structure includes a first interior opening coaxially aligned with a turbine wheel rotational axis;
the third sheet metal structure includes a second interior opening coaxially aligned with the turbine wheel rotational axis;
the outlet pipe is disposed within the first interior opening and the second interior opening;
a first end of the outlet pipe is joined to the second sheet metal structure about the first interior opening; and
the outlet pipe is joined to the third sheet metal structure about the second interior opening.

12. The turbine housing assembly of claim 1, wherein the tongue member includes a divider portion that radially separates the first sheet metal structure from the volute portion of the second sheet metal structure.

13. A turbine housing assembly comprising:
a bearing flange;
a tongue member directly coupled to the bearing flange, wherein a hermetic seal is established between the bearing flange and the tongue member;
an inlet sheet metal structure having an end coupled to the tongue member;
an inner sheet metal shell including an inlet portion and a volute portion, wherein:
the inlet portion of the inner sheet metal shell is coupled to the inlet sheet metal structure to cooperatively define an inlet passage; and
the volute portion of the inner sheet metal shell is coupled to the tongue member and the bearing flange to cooperatively define a volute in fluid communication with the inlet passage; and
an outer containment sheet metal shell surrounding at least a portion of the volute portion, wherein the outer containment sheet metal shell is coupled to the bearing flange and spaced apart from the inner sheet metal shell.

14. The turbine housing assembly of claim 13, wherein the tongue member comprises a sheet metal structure joined to the bearing flange.

15. The turbine housing assembly of claim 13, wherein the tongue member is integral with the bearing flange.

16. The turbine housing assembly of claim 15, wherein:
the bearing flange comprises a cast metal structure; and
the tongue member comprises a protruding portion of the cast metal structure.

17. The turbine housing assembly of claim 16, wherein the protruding portion radially separates the end of the inlet sheet metal structure from the volute portion of the inner sheet metal shell.

18. A method of fabricating a turbine housing, the method comprising:
forming a first inlet portion from a first sheet metal structure, the first sheet metal structure providing an inner contour of an inlet passage;

forming a second inlet portion providing an outer contour of the inlet passage and a volute portion providing an outer contour of a volute in fluid communication with the inlet passage from a second sheet metal structure including the second inlet portion and the volute portion;

forming a first joint between an end of the first inlet portion and a tongue member directly coupled to a bearing flange, resulting in the first sheet metal structure joined to the tongue member, wherein a hermetic seal is established between the bearing flange and the tongue member;

forming a second joint between the first inlet portion and the second inlet portion to define the inlet passage when the second inlet portion of the second sheet metal structure is joined to the first inlet portion of the first sheet metal structure; and forming a third joint between the volute portion and the tongue member, wherein the volute portion is joined to the tongue member to define the volute and the volute portion and the tongue member are cooperatively configured to define the volute in fluid communication with the inlet passage.

19. The method of claim 18, further comprising:

forming the tongue member from a third sheet metal structure; and forming a fourth joint between the tongue member and the bearing flange after forming the first joint between the end of the first inlet portion and the tongue member.

20. The method of claim 18, further comprising:

forming an outer containment shell from a third sheet metal structure, wherein the outer containment shell includes a cutout region corresponding to the inlet passage; and forming a fourth joint between the outer containment shell and the bearing flange, wherein the outer containment shell surrounds at least a portion of the volute portion and is spaced apart from the volute portion.

\* \* \* \* \*